United States Patent
Patel et al.

(10) Patent No.: US 11,196,611 B1
(45) Date of Patent: Dec. 7, 2021

(54) SYSTEMS AND METHODS FOR ELECTRONIC COMMUNICATION WITH A DEVICE USING AN UNKNOWN COMMUNICATIONS PROTOCOL

(71) Applicant: National Technology & Engineering Solutions of Sandia, LLC, Albuquerque, NM (US)

(72) Inventors: Silpan M. Patel, Albuquerque, NM (US); Peter A. Knee, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 724 days.

(21) Appl. No.: 15/685,373

(22) Filed: Aug. 24, 2017

(51) Int. Cl.
| | | |
|---|---|---|
| *H04L 29/06* | (2006.01) | |
| *G06K 9/00* | (2006.01) | |
| *G06N 5/04* | (2006.01) | |
| *G06K 9/62* | (2006.01) | |
| *G06F 17/18* | (2006.01) | |
| *G06N 20/00* | (2019.01) | |

(52) U.S. Cl.
CPC ........ *H04L 29/06013* (2013.01); *G06F 17/18* (2013.01); *G06K 9/00523* (2013.01); *G06K 9/6201* (2013.01); *G06N 5/04* (2013.01); *G06N 20/00* (2019.01)

(58) Field of Classification Search
CPC .............................. H04L 1/1825; H04W 24/08
See application file for complete search history.

(56) References Cited

U.S. PATENT DOCUMENTS

| | | | |
|---|---|---|---|
| 7,609,751 B1 | 10/2009 | Giallorenzi et al. | |
| 7,836,164 B2 | 11/2010 | Tawfik | |
| 8,254,986 B2* | 8/2012 | Russell | H04W 36/0066 |
| | | | 455/552.1 |
| 8,359,653 B2 | 1/2013 | Guruswamy | |
| 8,547,974 B1 | 10/2013 | Guruswamy et al. | |
| 9,374,397 B2 | 6/2016 | Platt et al. | |
| 10,097,225 B1* | 10/2018 | Beaudeau | H04B 1/16 |
| 2009/0252029 A1* | 10/2009 | Daetz | H04L 63/1441 |
| | | | 370/216 |

(Continued)

*Primary Examiner* — Ario Etienne
*Assistant Examiner* — Sm Z Islam
(74) *Attorney, Agent, or Firm* — Madelynne J. Farber; Mark A. Dodd

(57) ABSTRACT

Various technologies for communicating with systems that communicate using an unknown communications protocol are described herein. A transceiver intercepts a plurality of communications exchanged between two or more transceivers on a communications network. Pattern-recognition algorithms are executed over the plurality of communications, and features of an unknown communications protocol that governs the communications between the two or more transceivers are inferred based upon output of the pattern-recognition algorithms. A communication is formatted based upon the inferred features of the unknown communications protocol, and the communication transmitted to one or more systems on the communications network by way of the transceiver. The communication at least partially conforms to the unknown communications protocol, and so may be interpreted by systems on the network.

19 Claims, 6 Drawing Sheets

(56) References Cited

U.S. PATENT DOCUMENTS

| | | | | |
|---|---|---|---|---|
| 2010/0016748 A1* | 1/2010 | Syed | ............ | A61B 5/7275 |
| | | | | 600/523 |
| 2012/0094705 A1* | 4/2012 | Kish | ............ | H04B 7/061 |
| | | | | 455/509 |
| 2012/0230671 A1* | 9/2012 | Nakada | ............ | H04L 1/1825 |
| | | | | 398/1 |
| 2017/0094527 A1* | 3/2017 | Shattil | ............ | H04K 3/44 |
| 2017/0159045 A1* | 6/2017 | Serber | ............ | C12N 15/1058 |

* cited by examiner

SYSTEMS AND METHODS FOR ELECTRONIC COMMUNICATION WITH A DEVICE USING AN UNKNOWN COMMUNICATIONS PROTOCOL

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Communication between electronic systems generally occurs according to a shared protocol (e.g., WiFi, Bluetooth, etc.) that governs the communication. A communications protocol defines rules for communication between two or more electronic systems. The systems in a communications network communicate according to the rules so that communications between the systems can be understood by the parties to communication. A communications protocol may include rules for communication that are categorized in layers. For example, the Open Systems Interconnection seven-layer model ISO/IEC 7498-1 suggests seven layers of protocols that together comprise a full network communication protocol: 1) physical layer, 2) data link layer, 3) network layer, 4) transport layer, 5) session layer, 6) presentation layer, and 7) application layer. Generally, the systems in a network communicate in conformity to protocols in several such layers.

In some cases, two electronic systems, or parties, communicate according to a communications protocol that is unknown to a third party that desires to communicate with one or both of the two parties. However, communication is generally impossible unless the communications protocol being used by the two parties is known by the third party a priori.

SUMMARY

The following is a brief summary of subject matter that is described in greater detail herein. This summary is not intended to be limiting as to the scope of the claims.

Various technologies that facilitate electronic communication with systems using an unknown communications protocol are described herein. A communications system intercepts a plurality of communications transmitted back and forth between two electronic systems by way of a communications network. By way of example, the communications system comprises a transceiver that digitally samples a signal received by an antenna, wherein the signal comprises wireless communications transmitted between the two communicating electronic systems.

The communications system further comprises a computing device that is configured to format communications for transmission by way of the communications network, such that the communications at least partially conform to an unknown communications protocol in use by the two electronic systems communicating on the network. The computing device identifies features of the unknown communications protocol based on patterns in the plurality of intercepted communications. The computing device executes one or more pattern-recognition algorithms over communications data representative of the communications intercepted by the transceiver. The computing device infers features, or rules, of a communications protocol in use by the electronic systems on the communications network based on output of the pattern-recognition algorithms. The communications system then transmits a communication formatted according to the rules inferred by the computing device. The formatted communication at least partially conforms to the communications protocol in use on the communications network. Thus, the formatted communication is received by a device on the communications network and is understood by the device to be a valid communication.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
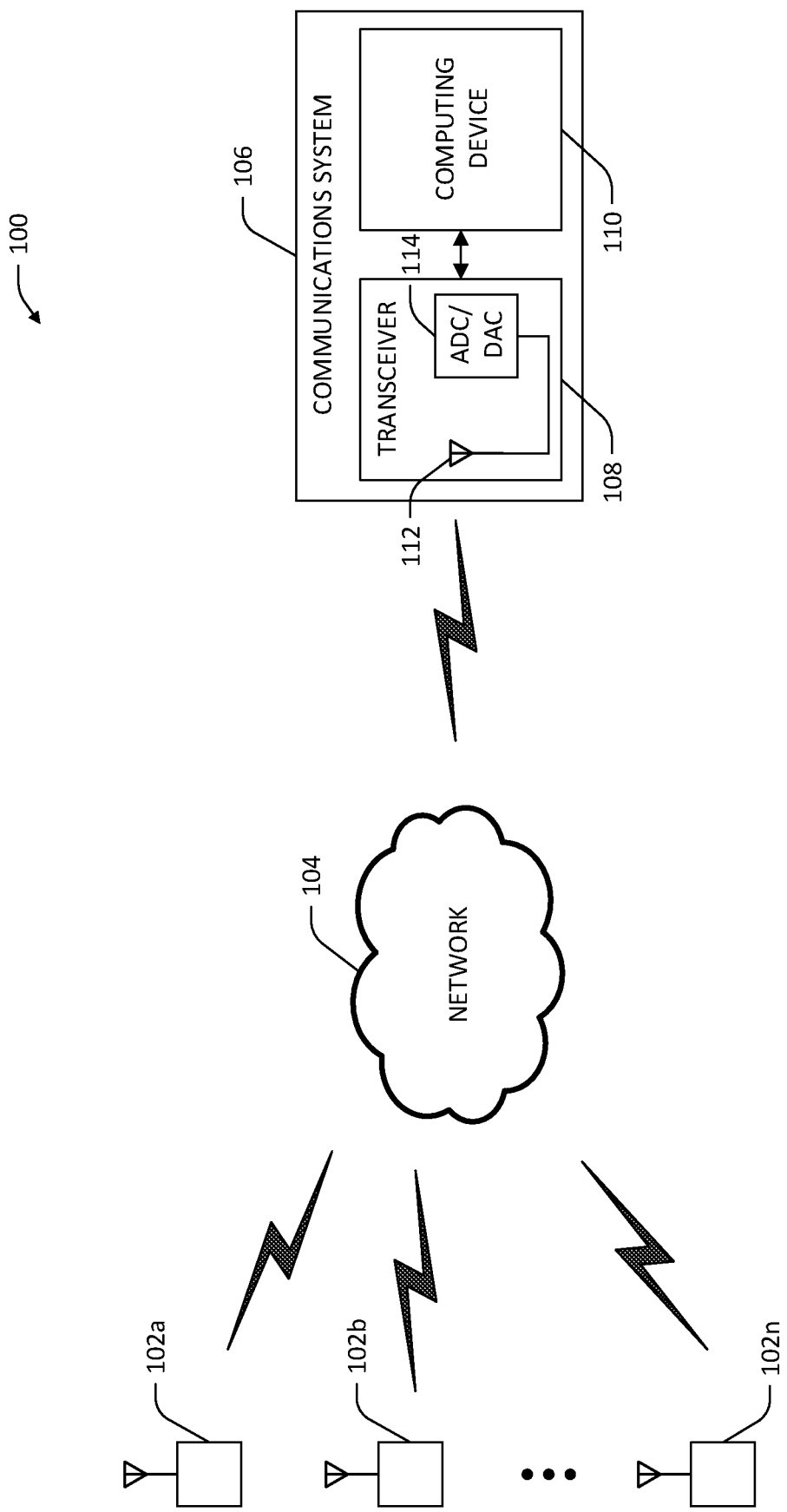
FIG. 1 is a functional block diagram of an exemplary system that facilitates communicating with systems using an unknown communications protocol on a network.

Various technologies pertaining to communicating with electronic systems that are communicating by way of an unknown communications protocol are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "module," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Furthermore, while methodologies are shown and described herein as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 1, an exemplary system 100 is illustrated, wherein a communications system facilitates communication with electronic systems that are communicating according to an unknown communications protocol. The system 100 includes a plurality of electronic systems 102a-102n in communication by way of a communications network 104. The systems 102a-102n communicate over the network 104 using a communications protocol that governs rules of communications between the systems 102a-102n. The system 100 further includes a communications system 106. In an example, the communications system 106 is a system controlled by a different party than any of the parties controlling the systems 102a-102n. Thus, the party controlling the communications system 106 may be unaware of the communications protocol being used by the other systems 102a-102n on the network 104.

The communications system 106 is configured to receive communications transmitted by way of the network 104 and identify features of the communications protocol in use on the network 104, where the protocol being used is not known to the communications system 106. The communications system 106 subsequently formats communications for transmission to the systems 102a-102n based on these characteristics so that the formatted communications can be interpreted by the systems 102a-102n. The communications system 106 can also use the identified characteristics of the protocol to decode and interpret further communications received from the systems 102a-102n by way of the network 104.

As used herein, a communication refers to substantially any electromagnetic (EM) radiation or signal transmitted by one device and received by another device. By way of example, a communication can be a time-varying EM signal transmitted over the air by way of an antenna, a digital signal transmitted by way of an electrically conducting wire or fiber-optic cable, etc. The electronic systems 102a-102n can be substantially any electronic systems that communicate by wired or wireless communication. For example, the systems 102a-102n can be computing devices, smartphones, remotely-controlled vehicles, etc. The network 104 by which the systems 102a-102n communicate can be substantially any communication medium. For example, the network 104 can comprise wireless data links between the systems 102a-102n (e.g., direct wireless communication between two or more of the systems 102a-102n, wireless communication between the systems 102a-102n and a communications intermediary such as a network hub, etc.) or a wired communications network.

The communications system 106 comprises a transceiver 108 that receives communications from and transmits communications to the network 104. The communications system 106 further comprises a computing device 110 that receives communications data from the transceiver 108, where the communications data is indicative of EM signals received at the transceiver 108. In the exemplary system 100, the transceiver 108 comprises an antenna 112 that wirelessly receives EM signals from the systems 102a-102n. The transceiver 108 further comprises an analog-to-digital/digital-to-analog (ADC/DAC) converter module 114. The ADC/DAC 114 digitally samples an electrical signal output by the antenna 112, where the electrical signal is indicative of the wireless EM signals received at the antenna 112. The ADC/DAC 114 outputs communications data comprising digital values indicative of a value of the amplitude of the electrical signal for each sampling time, and by extension the value of the amplitude of the wireless EM signals received at the antenna 112. The computing device 110 is configured to generate communications pattern data by executing a pattern-recognition algorithm over the communications data received from the transceiver 108. The computing device 110 then generates a communication that is formatted based on the communications pattern data, such that the communication at least partially conforms to the communications protocol being used by the systems 102a-102n that are communicating by way of the network 104. The computing device 110 provides the communication to the transceiver 108, whereupon the ADC/DAC 114 converts the digital communication to an analog signal that is then transmitted via the network 104 by way of the antenna 112. The analog signal, comprising the communication, is received by one or more of the systems 102a-102n by way of the network 104. Since the communication at least partially conforms to the communication protocol, the systems 102a-102n may be able to decode and interpret the communication.

Figure 2:
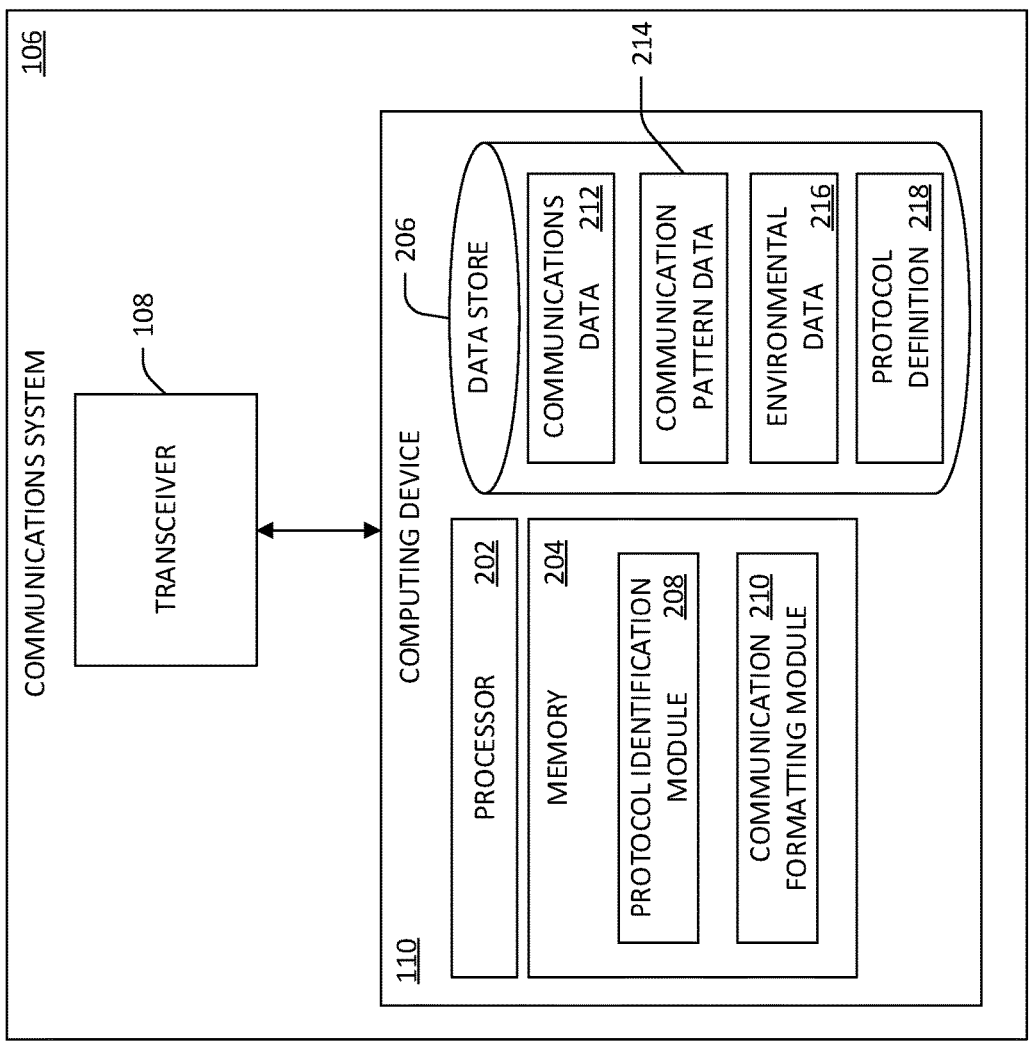
FIG. 2 is a functional block diagram of an exemplary communications system.

Referring now to FIG. 2, a functional block diagram of the communications system 106 is illustrated, showing the exemplary computing device 110 in greater detail. The computing device 110 includes a processor 202, memory 204 that is operably coupled to the processor 202, and a data store 206 that is operably coupled to the processor 202 and/or the memory 204. The memory 204 has loaded therein a protocol identification module 208 that is configured to identify features of an unknown communications protocol being used for communication by the systems 102a-102n on the network 104. The memory 204 further has loaded therein a communication formatting module 210 that is configured to format a communication to at least partially conform to the communications protocol based on the features of the protocol identified by the protocol identification module 208.

The protocol identification module 208 accesses communications data 212 that is stored in the data store 206. The communications data 212 comprises data indicative of a plurality of communications received from the network 104 by way of the antenna 112. For example, the communications data 212 can comprise digital values indicative of an amplitude value of the output of the antenna 112 for a plurality of different sample times. The protocol identification module 208 executes one or more pattern-recognition algorithms (e.g., a machine-learning algorithm, a motif discovery algorithm, a neural network, etc.) over the communications data 212 to generate communication pattern data 214. The communication pattern data 214 comprises data indicative of one or more features of the unknown communications protocol in use on the network 104. In an example, the communication pattern data 214 comprises a probability assigned to a feature label based upon execution of the pattern-recognition algorithm over the communications data 212. A feature of the communications protocol can be substantially any rule that governs communications between the systems 102a-102n. Feature labels can be predefined (e.g., based upon existing, known communications protocols) or can be generated by the protocol identification module 208 as part of execution of the pattern-recognition algorithm.

The communication formatting module 210 formats communications based upon the communication pattern data 214 for transmission via the network 104 by way of the transceiver 108. The communication formatting module 210 formats communications to conform to features of the unknown communications protocol identified by the protocol identification module 208 that are indicated in the communication pattern data 214. Thus, the communication formatting module 210 formats communications to at least partially conform to the unknown communications protocol in use on the network 104. The communication formatting module 210 provides formatted communications to the transceiver 108, whereupon the transceiver 108 outputs the formatted communications to the network 104. The formatted communications are then received by one or more of the systems 102a-102n, and may be interpretable by the systems 102a-102n by virtue of their at least partial conformity to the unknown communications protocol.

Pattern-recognition algorithms executed over the communications data 212 by the protocol identification module 208 can include a variety of machine learning and data mining algorithms. The communications data 212 includes time-of-receipt data for each of the communications represented by the communications data 212. The protocol identification module 208 executes the pattern-recognition algorithms over the communications data 212 based on the timing data for the communications. In one exemplary embodiment, the protocol identification module 208 executes a hidden Markov model over the communications data 212. In another embodiment, the protocol identification module 208 executes a motif discovery algorithm over the communications data 212 to identify or infer a feature of the unknown communications protocol. In still another embodiment, the protocol identification module 208 executes a deep neural network model based on the communications data 212 to identify a feature of the unknown communications protocol.

The protocol identification module 208 identifies features of the communications protocol for various layers of abstraction of the protocol (e.g., layers corresponding to model layers of the OSI seven-layer communication model). By way of example, the protocol identification module 208 can identify features of the communications protocol for various physical layer communication characteristics such as signal frequency, channel access method (e.g., frequency-division multiple access, or FDMA, time-division multiple access, or TDMA, code division multiple access, or CDMA, etc.), modulation, data rate, etc. The protocol identification module 208 can then identify features of the communications protocol at higher levels of abstraction based on the physical layer communication characteristics previously identified.

Figure 3:
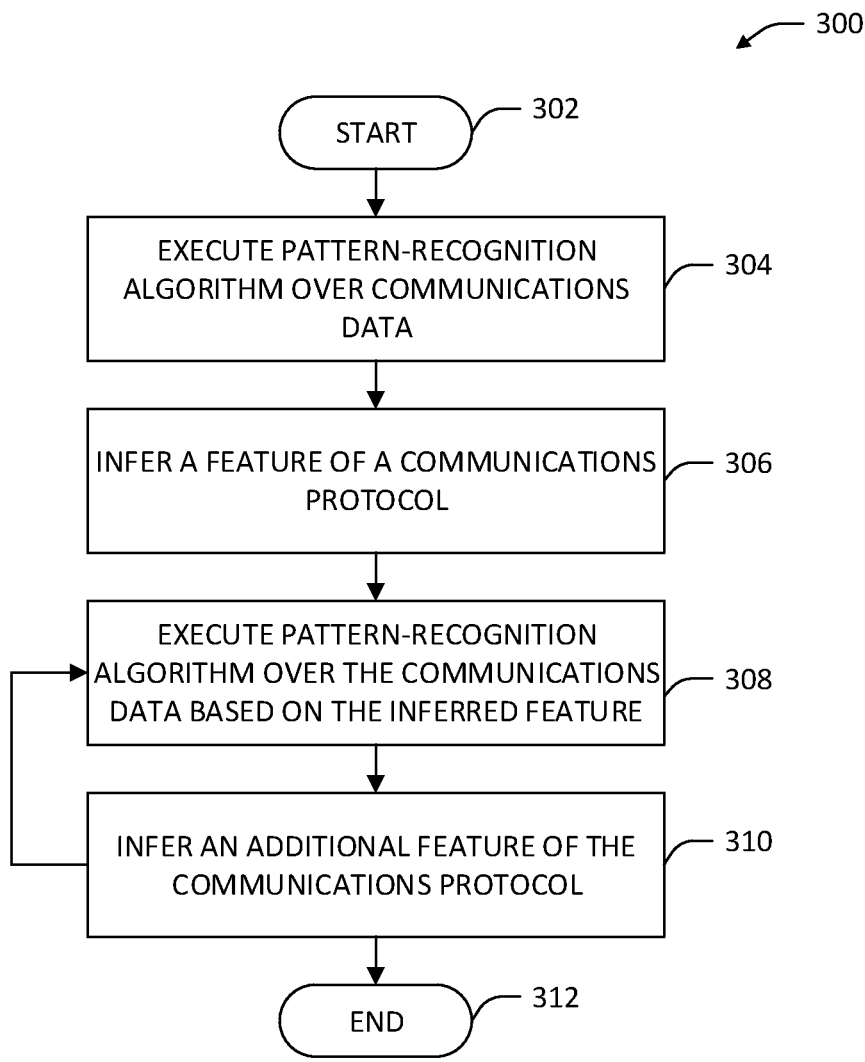
FIG. 3 is a flow diagram that illustrates an exemplary methodology for inferring features of an unknown communications protocol based on previously identified features of the protocol.

For example, referring now to FIG. 3, an exemplary methodology 300 is illustrated that is executed by the protocol identification module 208 in connection with identifying additional features of the unknown communications protocol based on previously identified features of the communications protocol. The methodology 300 begins at 302 and at 304 a pattern-recognition algorithm is executed over communications data representative of communications exchanged between systems on a monitored network. At 306, a feature of the communications protocol is inferred based upon execution of one or more pattern-recognition algorithms over the communications data. In an example, the feature inferred at 306 can be a physical layer feature of the protocol, such as a signal frequency used by systems communicating using the protocol. At 308, one or more pattern-recognition algorithms are executed over the communications data based upon the feature inferred at 306. Continuing the previous example, a pattern recognition algorithm can be executed over the communications data, where the communications data is interpreted by the protocol identification module 208 in light of the previously inferred signal frequency. Thus, for example, the protocol identification module 208 can decode the communications data based on the inferred signal frequency to derive digital values for the communications data. The protocol identification module 208 can then execute a pattern-recognition algorithm over the digital values. At 310 an additional feature of the communications protocol is inferred based upon executing the pattern-recognition algorithm at 308. Continuing the previous example further, the protocol identification module 208 can identify features such as bit rate, frame width, cyclic redundancy check codes (CRCs), etc. based upon output of the pattern-recognition algorithm executed over the digital values. Steps 308-310 of the methodology 300 can be repeated a plurality of times to identify further additional features of the unknown communications protocol. The methodology 300 ends at 312 after one or more conditions are met (e.g., a threshold number of iterations of executing the pattern-recognition algorithm is reached, a predefined number of features of the unknown protocol are identified, a specific feature of interest of the unknown protocol is identified, etc.).

Once various physical-layer features of the communications protocol of the network 104 have been identified, the protocol identification module 208 can identify features of the protocol such as CRCs, data frame width, address bits within a frame, etc. In connection with identifying such features, the protocol identification module 208 executes pattern-recognition algorithms over the communications data 212 based on the communication pattern data 214. By way of example, the communication pattern data 214 can include data indicative of physical layer characteristics such that the protocol identification module 208 can decode the communications data 212, which may be, for example, data indicative of digital samples of an analog signal received at the transceiver 108, to derive a stream of digital bit values. In an exemplary embodiment, the protocol identification module 208 can update the communications data 212 to be or include the digital bit values derived from data such as the digitally sampled analog signal. The protocol identification module 208 then executes a pattern-recognition algorithm over the derived bit values. Based on the output of the pattern-recognition algorithm, the protocol identification module 208 can infer features such as addresses, CRCs, frame width, frame trailer and header field sizes and values, location of data bits within frames etc. In an exemplary embodiment, the protocol identification module 208 can identify a bit value for at least one bit position in a data frame. For example, the protocol identification module 208 can identify as a feature of the unknown communications protocol that a frame conforming to the unknown communications protocol always begins with a binary logic "1". The protocol identification module 208 updates the communication pattern data 214 to reflect that a feature of the unknown communications protocol is a logic "1" being the first bit value of a data frame.

It is to be understood from the foregoing that the protocol identification module 208 can iteratively execute pattern-recognition algorithms over the communications data 212 in order to identify features of the unknown communications protocol at higher levels of abstraction in each iteration. Thus, once features of the unknown protocol such as addresses, CRCs, frame width, etc. are identified by the protocol identification module 208, the protocol identification module 208 can execute pattern-recognition algorithms over the communications data 212 based on those features to identify protocol features such as routing procedures. By way of an example, once the protocol identification module 208 is able to interpret communication frames transmitted between the systems 102a-102n, the protocol identification module 208 can identify patterns in routing of communications among the systems 102a-102n. For instance, the protocol identification module 208 can identify that one of the systems 102a-102n serves as a central communications hub that routes communications from one of the systems 102a-102n to another. Motif discovery algorithms may be particularly well-suited to identifying patterns of communication, such as routing patterns, that repeat over a sequence of a plurality of communications. It is to be understood that the protocol identification module 208 can select a pattern-recognition algorithm for execution over the communications data 212 based on a type or level of abstraction of a feature of the unknown communications protocol that is desirably identified.

In some exemplary embodiments, the protocol identification module 208 generates a communications schema that can be used in connection with formatting a communication for transmission by the transceiver 108 via the network 104. The communications schema can identify features of the unknown communications protocol at various layers of abstraction. The schema comprises fields corresponding to features of the unknown protocol. The communication formatting module 210 generates a communication for transmission via the network 104 by populating the fields of the schema with specific data or framing information. Based on the data in the various fields, systems 102a-102n that receive the communication by way of the network 104 are able to interpret the communication according to the unknown communication protocol.

Figure 4:
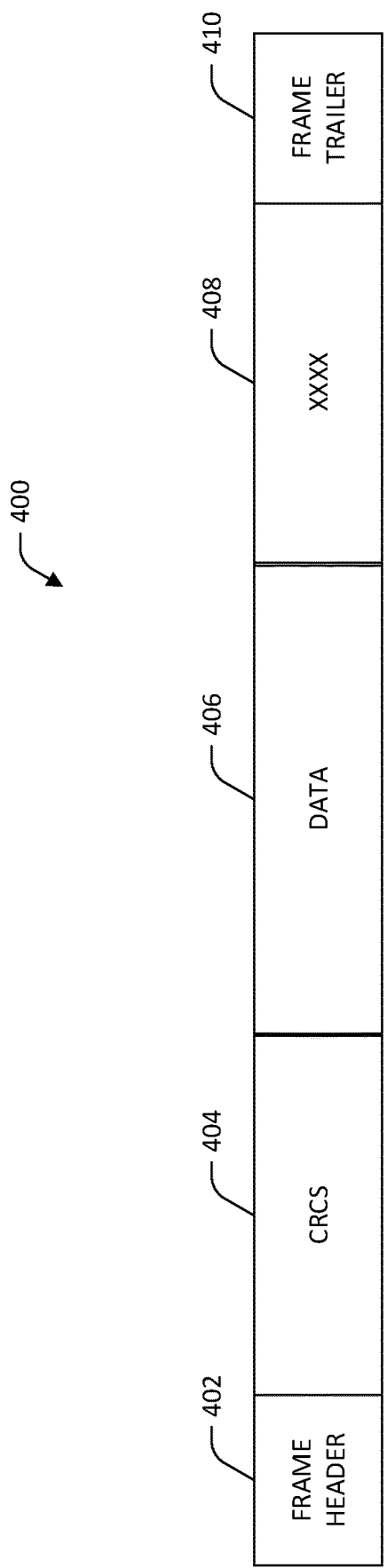
FIG. 4 is a schematic of an exemplary data frame schema.

For example, and referring now to FIG. 4, an exemplary data frame schema 400 is illustrated. The schema 400 represents features of the unknown communications protocol at a frame-level layer of abstraction. The schema 400 comprises a plurality of fields 402-410, each corresponding to a different inferred feature of data frames conforming to the unknown communications protocol. The exemplary schema 400 comprises a field 402 for a frame header, a field 404 for CRCs, a field 406 for data to be transmitted by the frame, and a field 410 for a frame trailer. The schema 400 also includes a field 408 of unknown or indeterminate function. It is to be understood that the protocol identification module 208 need not identify every feature of the unknown communications protocol in order to allow the communication formatting module 210 to construct interpretable communications. Thus, a communication formatted by the communication formatting module 210 and transmitted by the transceiver 108 to the network 104 may only partially conform to the unknown communications protocol, while still being interpretable by the systems 102a-102n.

The protocol identification module 208 can further identify features of the unknown communications protocol based on conditions external to the communications network 104. The protocol identification module 208 accesses environmental data 216 in the data store 206 in connection with executing the pattern-recognition algorithms over the communications data 212. The environmental data 216 comprises data indicative of various observations pertaining to conditions external to the communications network 104. The protocol identification module 208 executes the pattern-recognition algorithm over the communications data 212 and the environmental data 216, and outputs a probability of an association between a communication characteristic and a condition external to the network 104.

A condition external to the network 104 can be substantially any condition that is not descriptive of features of communications exchanged over the network 104. By way of example, if the system 102a is a remote-control vehicle, an external condition could be that the vehicle has changed a direction of travel. In the example, the environmental data 216 includes data indicative of the course change of the vehicle and a time associated with the course change. In the example, the protocol identification module 208 can execute the pattern-recognition algorithm over the communications data 212 and the data indicative of the course change. Responsive to executing the pattern-recognition algorithm, the protocol identification module 208 outputs a probability that a characteristic of a communication is associated with the condition external to the network 104. For example, the protocol identification module 208 can identify, based on the execution of the pattern-recognition algorithm, that a particular data value transmitted to the system 102a causes the vehicle to implement a course change.

In other exemplary embodiments, the protocol identification module 208 can identify features of the communications represented by the communications data 212 in connection with comparing the communications to a predefined communication protocol (e.g., the WiFi protocol, the Bluetooth protocol, etc.). The protocol identification module 208 executes one or more pattern-recognition algorithms over the communications data 212 in order to identify features of the unknown communication protocol in use on the network 104. The protocol identification module 208 can then compare the identified features to a predefined protocol definition 218 in the datastore 206. Responsive to determining that the identified features match the protocol definition 218, the protocol identification module 208 outputs communication pattern data 214 that is indicative of the unknown protocol being the protocol represented by the protocol definition 218. In an exemplary embodiment, the protocol identification module 208 can label the unknown communication protocol as being the predefined communications protocol represented by the protocol definition 218 responsive to determining that a probability of the unknown protocol matching the protocol definition 218 exceeds a threshold value, the probability computed based upon the identified characteristics of the unknown protocol. Responsive to the protocol identification module 208 inferring that the unknown protocol in use on the network 104 is the protocol represented by the protocol definition 218, the communication formatting module 210 can format communications to conform to the protocol based on the protocol definition 218.

It is to be understood that inferences made about the unknown communications protocol by the protocol identification module 208 may not be correct. In exemplary embodiments, the communications system 106 can be configured to update an inference with respect to a feature of the unknown communications protocol responsive to receipt of additional communications at the transceiver 108. In an example, responsive to receiving communications data for a network communication from the transceiver 108, the computing device 110 updates the communications data 212, and the protocol identification module 208 executes a pattern-recognition algorithm over the updated communications data 212. The protocol identification module 208 updates the communication pattern data 214 if it is determined that an additional inference can be made about features of the unknown protocol, or if it is determined that a previously made inference is likely to be incorrect. The communications formatting module 210 then formats subsequent communications for transmission by the transceiver 108 based upon the updated communication pattern data 214.

Figure 5:
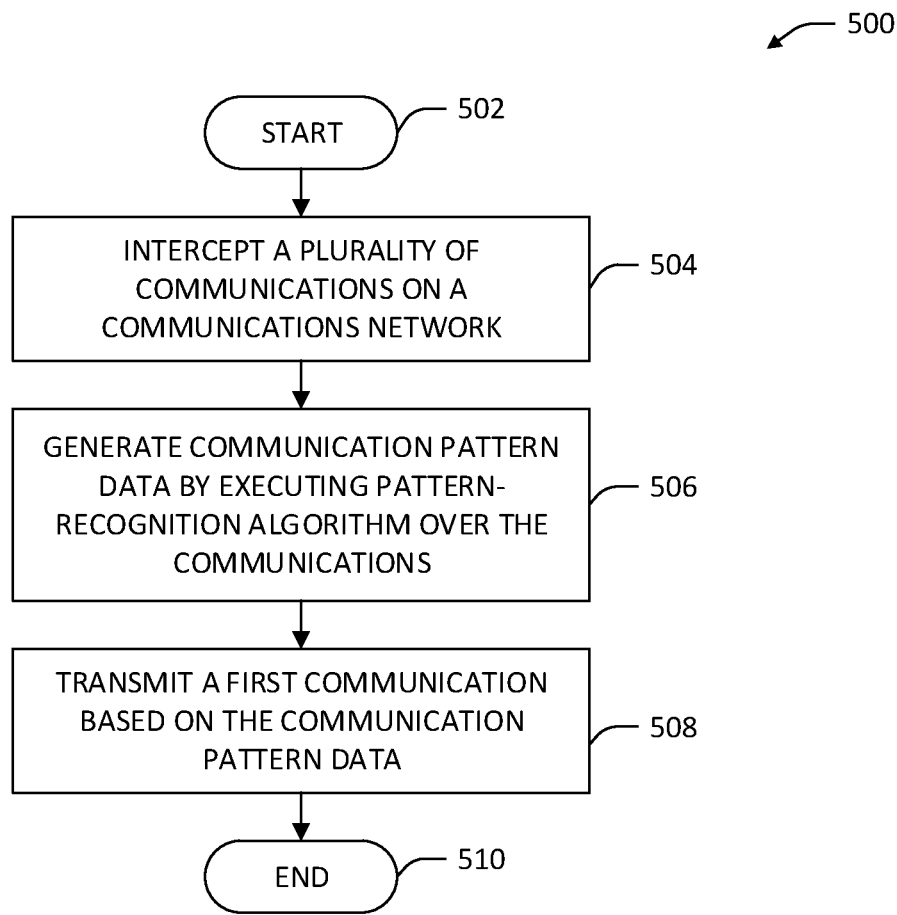
FIG. 5 is a flow diagram that illustrates an exemplary methodology for communicating with systems using an unknown communications protocol on a network.

Referring now to FIG. 5, an exemplary methodology 500 that facilitates communication with systems on a network using an unknown communications protocol. The methodology 500 begins at 502 and at 504 a plurality of communications are intercepted from a communications network. As used herein, intercepting a communication encompasses receiving the communication wirelessly, receiving the communication over a shared wired network, etc. In an example, an intercepted communication is received at a wired or wireless transceiver, wherein the intercepted communication is not directly addressed to the transceiver. At 506, communication pattern data is generated by executing one or more pattern-recognition algorithms over the communications received at 504. The communication pattern data is indicative of a feature of an unknown communications protocol in use on the communications network, where the plurality of communications received at 504 conform to the unknown communications protocol. At 508, a first communication is transmitted to one or more systems by way of the communications network, where the first communication is formatted based upon the communication pattern data and configured to at least partially conform to the unknown communications protocol in use on the network. The methodology ends at 510.

Figure 6:
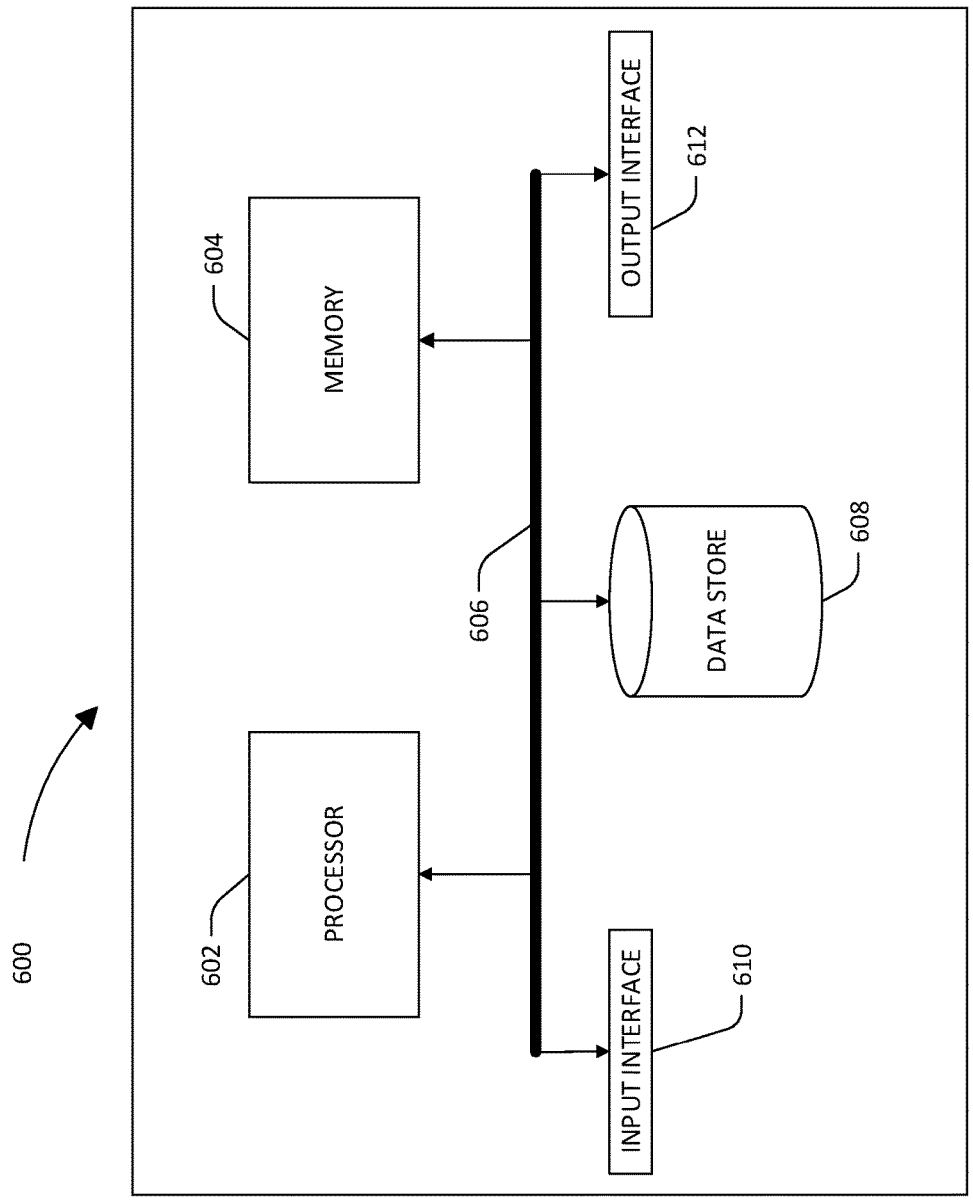
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that executes pattern-recognition algorithms over intercepted communications. By way of another example, the computing device 600 can be used in a system that formats communications to conform to inferred features of an unknown communications protocol. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store communications data, communications pattern data, environmental data indicative of conditions external to a communications network, etc.

The computing device 600 additionally includes a data store 608 that is accessible by the processor 602 by way of the system bus 606. The data store 608 may include executable instructions, communications data, communications pattern data, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a transceiver that intercepts a plurality of communications between two or more transceivers in a communications network, the plurality of communications conforming to an unknown communications protocol, the system having no a priori knowledge of the unknown communications protocol upon interception of the first of the plurality of communications; and
   a computing device comprising:
      a processor; and
      memory comprising instructions that, when executed by the processor, perform the following acts:
         responsive to receiving the plurality of communications from the transceiver, generating communication pattern data by executing a pattern-recognition algorithm over the plurality of communications, the communication pattern data indicative of a feature of the unknown communications protocol;
         generating a communications schema based upon the communication pattern data, the communications schema partially conforming to the unknown communications protocol;
         formatting a first communication to conform with the communications schema; and
         outputting the first communication by way of the transceiver to a first transceiver in the communications network.

2. The system of claim 1, wherein the plurality of communications between the two or more transceivers in the communications network are wireless communications.

3. The system of claim 1, wherein the communications schema comprises a plurality of fields, each field of the communications schema corresponding to a respective feature of the unknown communications protocol in use on the communications network.

4. The system of claim 1, wherein the feature of the unknown communications protocol comprises a bit value for at least one bit position in a data frame.

5. The system of claim 1, the acts further comprising receiving data indicative of a condition external to the communications network, wherein the communication pattern data is generated by executing the pattern-recognition algorithm over the plurality of communications and the data indicative of the condition external to the communications network.

6. The system of claim 1, the communication pattern data generated based at least in part on a respective time of receipt of each of the plurality of communications.

7. The system of claim 1, wherein the pattern-recognition algorithm comprises a hidden Markov model.

8. The system of claim 1, wherein the pattern-recognition algorithm comprises a deep neural network.

9. The system of claim 1, wherein the pattern-recognition algorithm comprises a motif discovery algorithm.

10. The system of claim 1, wherein the feature is a frequency of communication between the two or more transceivers on the communications network.

11. The system of claim 1, wherein the feature is a characteristic of a data frame.

12. The system of claim 1, wherein the feature of the unknown communications protocol is a physical layer feature.

13. A method, comprising:
   intercepting a plurality of communications between two or more transceivers in a communications network, the plurality of communications conforming to an unknown communications protocol, the unknown communications protocol being a communications protocol about which no a priori knowledge is known;
   generating communication pattern data by executing a pattern-recognition algorithm over the plurality of communications, the communication pattern data indicative of a feature of the unknown communications protocol;
   generating a communications schema based upon the communication pattern data, the communications schema partially conforming to the unknown communications protocol;
   formatting a first communication to conform with the communications schema; and
   transmitting the first communication to a first transceiver in the communications network.

14. The method of claim 13, wherein the pattern-recognition algorithm comprises at least one of a hidden Markov model, a deep neural network, and a motif discovery algorithm.

15. The method of claim 13, further comprising:
   responsive to generating the communication pattern data, executing one or more pattern-recognition algorithms over the plurality of communications based upon the communication pattern data; and
   updating the communication pattern data, wherein the updated communication pattern data is indicative of a second feature of the unknown communications protocol.

16. The method of claim 13, further comprising:
   receiving data indicative of a condition external to the communications network;

executing one or more pattern-recognition algorithms over the plurality of communications and the data indicative of the external condition; and outputting data indicating that a characteristic of a communication in the plurality of communications is associated with the external condition.

17. The method of claim 13, wherein the feature is a channel access method.

18. The method of claim 13, wherein the feature is a bit rate.

19. A computer-readable storage device comprising instructions that, when executed by a processor, perform the following acts:

intercepting a plurality of communications between two or more transceivers in a communications network, the plurality of communications conforming to an unknown communications protocol, the unknown communications protocol being a communications protocol about which no a priori knowledge is known;

executing a pattern-recognition algorithm over the plurality of communications;

inferring a feature of the unknown communications protocol based upon executing the pattern-recognition algorithm;

generating a communications schema based upon the inferred feature, the communications schema partially conforming to the unknown communications protocol;

formatting a first communication to conform with the communications schema; and transmitting the first communication to a first transceiver in the communications network.

\* \* \* \* \*